US012258538B2

(12) United States Patent
Ahn

(10) Patent No.: US 12,258,538 B2
(45) Date of Patent: Mar. 25, 2025

(54) CANDLE INCLUDING FUEL SUPPLY PART

(71) Applicant: Sang Kueon Ahn, Seoul (KR)

(72) Inventor: Sang Kueon Ahn, Seoul (KR)

( * ) Notice: Subject to any disclaimer, the term of this patent is extended or adjusted under 35 U.S.C. 154(b) by 0 days.

(21) Appl. No.: 18/703,225

(22) PCT Filed: Oct. 13, 2022

(86) PCT No.: PCT/KR2022/015481
§ 371 (c)(1),
(2) Date: Apr. 19, 2024

(87) PCT Pub. No.: WO2023/068650
PCT Pub. Date: Apr. 27, 2023

(65) Prior Publication Data

US 2024/0336872 A1 Oct. 10, 2024

(30) Foreign Application Priority Data

Oct. 20, 2021 (KR) ........................ 10-2021-0140481

(51) Int. Cl.
*C11C 5/00* (2006.01)

(52) U.S. Cl.
CPC .............. *C11C 5/008* (2013.01); *C11C 5/006* (2013.01)

(58) Field of Classification Search
CPC ................................ C11C 5/008; C11C 5/006
See application file for complete search history.

(56) References Cited

U.S. PATENT DOCUMENTS

| | | | |
|---|---|---|---|
| 4,384,847 | A | 5/1983 | Schirneker |
| 10,378,754 | B1 | 8/2019 | Durrence et al. |
| 2012/0082947 | A1 | 4/2012 | Crapser et al. |

FOREIGN PATENT DOCUMENTS

| | | | |
|---|---|---|---|
| KR | 10-2011-0016029 | A | 2/2011 |
| KR | 10-2011-0017075 | A | 2/2011 |
| KR | 20-0452808 | Y1 | 3/2011 |
| KR | 10-2018-0006267 | A | 1/2018 |
| KR | 10-2018-0098427 | A | 9/2018 |
| KR | 20180098427 | A * | 9/2018 |

(Continued)

OTHER PUBLICATIONS

KR-102269188-B1 English Translation; 2021.*

(Continued)

*Primary Examiner* — Ellen M McAvoy
*Assistant Examiner* — Chantel Graham
(74) *Attorney, Agent, or Firm* — Sughrue Mion, PLLC

(57) ABSTRACT

Disclosed is a candle including a combustion part; a wick support that is mounted to be attachable to and detachable from a bottom surface of a center of a storage space of the combustion part, has a flow tube, in which a fuel fed through a through-hole is able to flow upward due to capillary action, formed therein at a center of an inner portion to allow an upper surface and a lower surface to communicate with each other, and has a wick insertion hole formed at a center of the upper surface to allow a candle wick; a storage part having a fuel supply through-hole formed in one side surface of a lower portion; and a fuel supply communication part mounted to allow communication between the fuel accommodation through-hole of the combustion part and the fuel supply through-hole of the storage part.

5 Claims, 9 Drawing Sheets

(56) References Cited

FOREIGN PATENT DOCUMENTS

| | | | | |
|---|---|---|---|---|
| KR | 20-2021-0001412 | U | | 6/2021 |
| KR | 102269188 | B1 | * | 6/2021 |

OTHER PUBLICATIONS

KR-20180098427-A English Translation; 2018.*
Written Decision on Registration in Korean application No. 10-2021-0140481 dated Dec. 21, 2021.
International Search Report for International Application No. PCT/KR2022/015481 dated Jan. 16, 2023.

* cited by examiner

<RELATED ART>

(A)

(B)

CANDLE INCLUDING FUEL SUPPLY PART

This is a National Stage Application of International Application No. PCT/KR2022/015481 filed Oct. 13, 2022, claiming priority based on Korean Patent Application No. 10-2021-0140481 filed Oct. 20, 2021, the entire disclosures of which are incorporated herein by reference.

TECHNICAL FIELD

The present invention relates to a candle including a fuel supply part, and more particularly, to a candle including a configuration that can continuously supply fuel to a combustion space, enhance aesthetics, and improve a scent producing effect.

BACKGROUND ART

Generally, candles were used for lighting in the past and are widely used in creating certain atmospheres or in religious communities nowadays. Typical candles have a form in which paraffin is solidified into a solid bar shape and a wick is buried therein.

Such candles emit heat and light due to candle wax that melts due to heat generated as the wick buried therein burns. Once used, the candles are not reusable. Dripping candle wax makes the surroundings messy and also poses a risk of fire.

Accordingly, in recent years, a paraffin candle that is reusable due to using liquid paraffin, keeps the surroundings clean, and significantly reduces a risk of fire has been proposed. That is, Korean Utility Model Registration No. 20-0210010 is one example thereof. (A) of FIG. 1 is a longitudinal cross-sectional view schematically illustrating the conventional paraffin candle, and (B) of FIG. 1 is a longitudinal cross-sectional view schematically illustrating the conventional paraffin candle that is used.

First, referring to (A) of FIG. 1, the conventional candle includes a cup-shaped case 2, paraffin 4 filled therein, and a floating body 8 that can float in the paraffin 4 and has a wick 6 provided therein to come in contact with the paraffin 4, absorb the paraffin 4 that is melted, and burn.

The conventional candle configured as described above begins to burn when the wick 6 is initially lighted. As the wick 6 continuously absorbs the paraffin 4 and burns, the conventional candle emits heat and light. Here, since the floating body 8 burns in the cup-shaped case 2, the floating body 8 is not much affected by external wind and stably burns, and the paraffin 4 does not drip, which keeps the surroundings clean.

However, as in (B) of FIG. 1, when the paraffin 4 filled in the case 2 begins to burn, the floating body 8 floating in the paraffin 4 gradually moves downward with a decreasing level of the paraffin 4, and after a certain amount of time passes, a lower surface of the floating body 8 touches a bottom surface of the case 2, and the wick 6 provided in the floating body 8 is bent toward any one side. Then, there is a disadvantage in that, for the paraffin candle to be reused, a user has to take the floating body 8 out of the case 2 and replace the wick 6 with a new wick or straighten the bent wick 6.

Therefore, there is a need for technology that can address the above-mentioned problems of the related art.

DISCLOSURE

Technical Problem

The present invention is directed to providing a candle including a configuration in which continuous fuel supply is possible due to being able to separate a space in which a fuel burns and light is generated and a space to which the fuel is supplied, aesthetics can be enhanced by easily applying various designs, and a scent producing effect can be improved.

Technical Solution

One aspect of the present invention provides a candle including: a combustion part having a storage space of a predetermined volume formed therein and an open upper surface and having a fuel accommodation through-hole formed in one side surface of a lower portion: a wick support having a columnar structure that is mounted to be attachable to and detachable from a bottom surface of a center of the storage space of the combustion part and extends a predetermined height upward, having a through-hole formed in one side surface of a lower portion, having a flow tube, in which a fuel fed through the through-hole is able to flow upward due to capillary action, formed therein at a center of an inner portion to allow an upper surface and a lower surface to communicate with each other, and having a wick insertion hole formed at a center of the upper surface to allow a candle wick to be mounted and communicate with the flow tube: a storage part having a storage space of a predetermined volume formed therein and an open upper surface and having a fuel supply through-hole formed in one side surface of a lower portion; and a fuel supply communication part mounted to allow communication between the fuel accommodation through-hole of the combustion part and the fuel supply through-hole of the storage part.

In one embodiment of the present invention, the combustion part, the wick support, the storage part, and the fuel supply communication part may be made of a metal material that absorbs heat generated due to a flame burning the fuel while fixed due to the wick support and transfers the heat to the combustion part, the fuel supply communication part, and the fuel stored in the storage part.

Here, the metal material constituting the combustion part, the wick support, the storage part, and the fuel supply communication part may be a material having thermal conductivity ranging from 100 W/mK to 450 W/mK.

Also, the metal material constituting the combustion part, the wick support, the storage part, and the fuel supply communication part may be an alloy material mixed with one or more materials selected from the group consisting of a silver material, a copper material, a gold material, a zinc material, an aluminum material, and a tungsten material or other metal materials.

In one embodiment of the present invention, the bottom surface of the combustion part may have a structure that comes in contact with and is parallel to a ground on which the candle will be installed, the fuel supply communication part may be mounted to have a structure that is inclined upward at an angle ranging from 5° to 60° based on the fuel accommodation through-hole of the combustion part, and a bottom surface of the storage part may be an inclined surface that continues from the inclined structure of the fuel supply communication part.

In one embodiment of the present invention, the storage part may include a fuel supply guide plate having a plate-shaped structure that comes in contact with an inner side surface of the storage space of the storage part and covers the open upper surface thereof, having a mesh-type structure in which a plurality of through-holes are formed, and made of a metal material that is heated by heat transferred to the storage part and transfers heat to an upper surface of the fuel stored in the storage part.

In one embodiment of the present invention, the wick support may include: a fixing leg mounted to be attachable to and detachable from the bottom surface of the center of the storage space of the combustion part and radially extending about a central support to fix the position of the central support; and a wick end support member having a structure that radially extends from a center of an upper surface of the central support, forms a curved structure by being wound downward with a predetermined radius of curvature, and supports a portion of a side surface of an upper portion of the candle wick mounted in the wick insertion hole.

Also, the fixing leg of the wick support may be mounted to be attachable to and detachable from the central support, and the fixing leg of the wick support may include a height-changeable structure that is able to change a height at which the central support extends upward.

In one embodiment of the present invention, the candle may include: a combustion part housing which is mounted to surround a side surface and a lower surface of the combustion part while opening the upper surface of the combustion part to the outside and which is filled with an insulating material or has an insulating structure formed therein: a communication part housing which is formed to surround an outer portion of the fuel supply communication part and which is filled with an insulating material or has an insulating structure formed therein; and a storage part housing which is formed to surround an outer portion of the storage part, has a structure on which an opening/closing member configured to open or close the upper surface of the storage part to or from the outside is mounted, and which is filled with an insulating material or has an insulating structure formed therein.

Also, the combustion part housing may include: an air intake configured to communicate with the storage space of the combustion part and supply air from the outside to the inside of the storage space of the combustion part; and an air intake amount adjustment member mounted on a side surface of the combustion part housing and configured to adjust a degree of opening of the air intake.

In one embodiment of the present invention, the combustion part housing may include: a heat absorption part which is mounted on an upper portion of the storage space of the combustion part, mounted on an inner side surface of the open upper surface of the combustion part, has a curved structure having a center of a radius of curvature disposed at a center of an upper surface of the wick support, and is configured to absorb thermal energy generated due to a flame that burns at the upper surface of the wick support: a rotating part which is mounted to surround an outer circumferential surface of an upper portion of the wick support, has a structure having an outer diameter equal to an inner diameter of the open upper surface of the combustion part, and is configured to rotate due to air that is fed from the air intake and flows through the open upper surface of the combustion part: a forced refrigerant circulation part which has a pipe structure mounted to surround the outer circumferential surface of the upper portion of the wick support and is configured to cause a refrigerant flowing therein to flow in one direction due to the rotation of the rotating part and cause a refrigerant received from a heating pipe part to flow to a heat absorption pipe part: the heat absorption pipe part which is mounted in the heat absorption part, extends in a direction identical to a direction in which the heat absorption part extends, and is configured to transfer thermal energy absorbed from the heat absorption part to a refrigerant flowing therein and cause the refrigerant received from the forced refrigerant circulation part to flow to the heating pipe part; and the heating pipe part which is mounted to surround an outer circumferential surface of the fuel supply communication part, has a pipe structure configured to cause a heated refrigerant received from the heating pipe part to flow, and is configured to transfer thermal energy of the heated refrigerant to the fuel supply communication part and cause the refrigerant received from the heat absorption pipe part to flow to the heat absorption pipe part.

In one embodiment of the present invention, the candle may include: a controller mounted in the storage part housing and configured to control an operation of the air intake amount adjustment member based on data received from a light amount detection member and data input from a smart device of a user and deliver information relating to an operational state of the candle to the smart device of the user through a wireless communication module based on data detected from a fuel amount detection member; the wireless communication module mounted in the controller and configured to wirelessly interoperate with the smart device of the user, receive a control signal from the smart device of the user, transmit the control signal to the controller, and transfer data generated from the controller to the smart device of the user; the light amount detection member mounted in the combustion part housing and configured to detect a light amount of a flame burning in the combustion part in real time and then transfer detected data to the controller; and the fuel amount detection member mounted in the storage part housing and configured to detect an amount of fuel stored in the storage part in real time and then transfer detected data to the controller.

In one embodiment of the present invention, the fuel accommodation through-hole of the combustion part may have a structure that is able to be assembled to or disassembled from the fuel supply communication part, the fuel supply through-hole of the storage part may have a structure that is able to be assembled to or disassembled from the fuel supply communication part, and the fuel supply communication part may be bound to the fuel accommodation through-hole and the fuel supply through-hole by a structure that is able to change a slope in a vertical height direction.

Advantageous Effects

As described above, according to a candle of the present invention, since a combustion part, a wick support, a storage part, and a fuel supply communication part each having a specific structure are included, it is possible to provide a candle including a configuration in which continuous fuel supply is possible due to being able to separate a space in which a fuel burns and light is generated and a space to which the fuel is supplied.

Also, according to a candle of the present invention, since a combustion part, a wick support, a storage part, and a fuel supply communication part each made of a metal material having excellent thermal conductivity are included, thermal energy, which is generated in a process in which a fuel burns at an upper end of the wick support, can be effectively transferred to the fuel supply communication part and the storage part through the wick support and the combustion part, and solidification of the fuel flowing through the inside of the fuel supply communication part can be prevented using received thermal energy. Thus, it is possible to provide a candle that can ensure continuous supply of a fuel stored in the storage part.

Also, according to a candle of the present invention, since a flow space ranging from a bottom surface of a combustion part to a bottom surface of a storage part via a fuel supply communication part is formed to have an inclined structure, a fuel stored in the storage part can naturally flow into the combustion part through a fuel supply communication part after melting due to thermal energy provided from the outside. Thus, it is possible to provide a candle that can ensure continuous supply of the fuel stored in the storage part.

Also, according to a candle of the present invention, since a fuel supply guide plate having a specific structure is included, thermal energy transferred to a storage part can be received and effectively transferred also to an upper surface of a fuel stored in the storage part, and a phenomenon in which only a portion of a lower end of the fuel stored in the storage part melts, causing an empty space to be formed, and a solid-phase fuel located at an upper portion of the empty space collapses inside the storage part at an unspecified point in time can be prevented. Thus, it is possible to provide a candle that can ensure stable and continuous supply of the fuel stored in the storage part.

Also, according to a candle of the present invention, since a fixing leg, a wick end support member, and a height-changeable structure each having a specific structure are included, the position of a candle wick can be stably fixed, and thus it is possible to provide a candle that allows a fuel to be stably absorbed into the candle wick, prevents the candle wick itself from burning and shortening, and allows the height of the candle wick to be easily changed according to a user's intention.

Also, according to a candle of the present invention, since a combustion part housing, a communication part housing, a storage part housing, and an opening/closing member each having a specific structure are included, insulation can be performed to prevent thermal energy generated due to burning of a fuel in a combustion part from being emitted to the outside, and the thermal energy generated in the combustion part can be effectively transferred to a fuel supply communication part and a storage part, and as a result, solidification of a fuel flowing through the inside of the fuel supply communication part can be prevented using the received thermal energy. Thus, it is possible to provide a candle that can ensure continuous supply of a fuel stored in the storage part.

Also, according to a candle of the present invention, since various designs may be applied to outer shapes or outer surfaces of a combustion part housing, a communication part housing, a storage part housing, and an opening/closing member, various outer shapes and colors can be expressed according to an intention of a manufacturer or a user. Thus, it is possible to provide a candle of which the aesthetics can be enhanced by the manufacturer or user.

Also, according to a candle of the present invention, since an air intake and an air intake amount adjustment member each having a specific structure are mounted in a combustion part housing, it is possible to provide a candle that allows an amount of fuel burning in a combustion part and a light amount of a flame generated in the combustion part to be adjusted according to a user's intention.

Also, according to a candle of the present invention, since a heat absorption part, a rotating part, a forced refrigerant circulation part, a heat absorption pipe part, and a heating pipe part each having a specific structure are included, thermal energy generated in a combustion part can be absorbed, and the absorbed thermal energy can be transferred to an outer circumferential surface of a fuel supply communication part, and as a result, solidification of a fuel flowing through the inside of the fuel supply communication part can be prevented using the received thermal energy. Thus, it is possible to provide a candle that can ensure continuous supply of a fuel stored in a storage part.

In addition, according to a candle of the present invention, since a controller, a wireless communication module, a light amount detection member, and a fuel amount detection member each performing a specific role are included, an amount of fuel burning in a combustion part can be easily adjusted according to a user's intention, a light amount of a flame generated due to burning in the combustion part can be easily adjusted, and the amount of fuel stored in a storage part can be checked in real time. Thus, it is possible to provide a candle that allows a time to refill the fuel to be conveniently checked.

BEST MODE OF THE INVENTION

Hereinafter, exemplary embodiments of the present invention will be described in detail with reference to the accompanying drawings. Prior to the description, it should be noted that the terms or words used in the present specification and the claims should not be interpreted as being limited to their general or dictionary meanings and should be interpreted as having meanings and concepts consistent with the technical spirit of the present invention.

Throughout the specification, when a certain member is described as being "on" another member, this not only includes a case in which the certain member is in contact with the other member, but also includes a case in which another member is present between the two members. Throughout the specification, when a certain part is described as "including" a certain component, this means that the certain part may further include other components, instead of excluding other components, unless the context clearly indicates otherwise.

Figure 1:
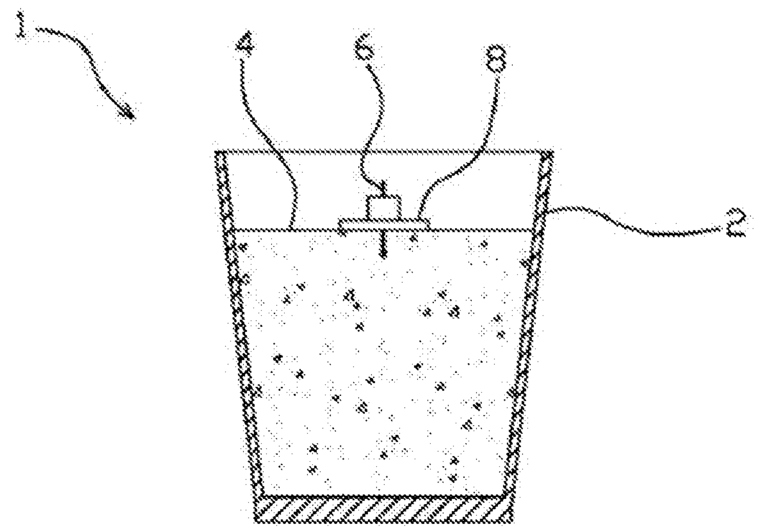
FIG. 1 shows longitudinal cross-sectional views of a structure of a candle according to the related art.
Figure 1:
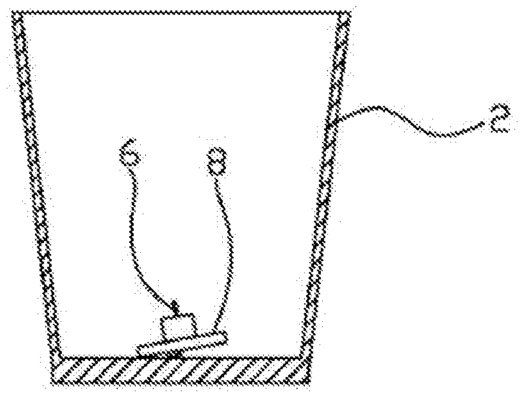
Figure 2:
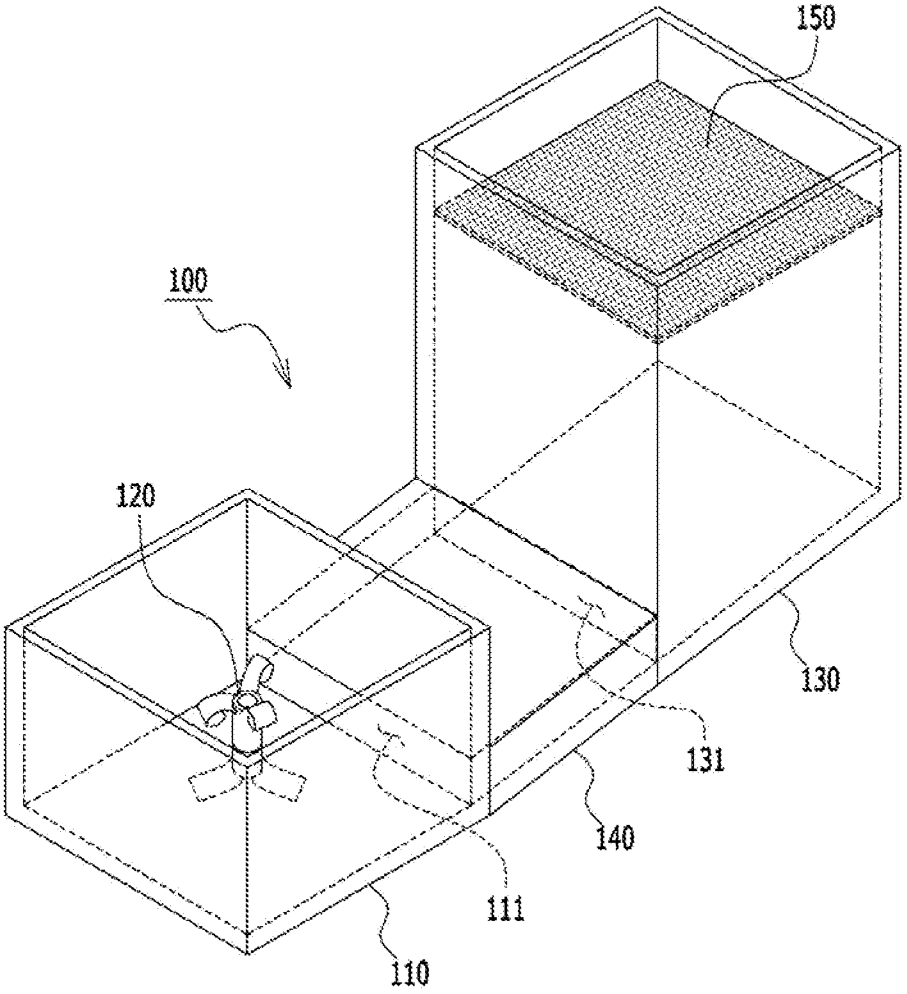
FIG. 2 is a perspective view illustrating a candle according to one embodiment of the present invention.

FIG. 2 is a perspective view illustrating a candle according to one embodiment of the present invention.

Referring to FIG. 2, a candle 100 according to the present embodiment has a combustion part 110, a wick support 120, a storage part 130, and a fuel supply communication part 140 each having a specific structure, and thus it is possible to provide a candle including a configuration in which continuous fuel supply is possible due to being able to separate a space in which a fuel burns and light is generated and a space to which the fuel is supplied.

Hereinafter, each component constituting the candle 100 according to the present embodiment will be described in detail.

Figure 3:
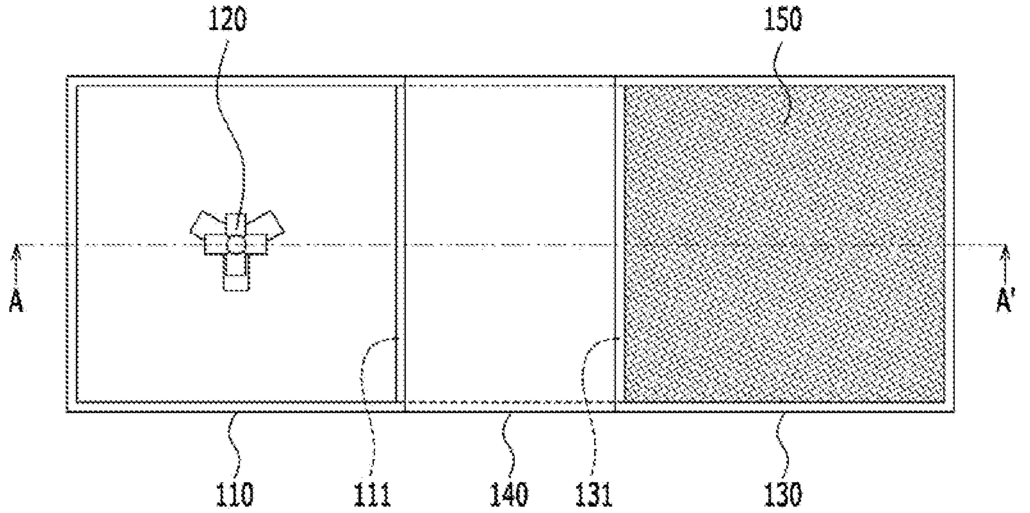
FIG. 3 is a plan view of the candle illustrated in FIG. 2.
Figure 4:
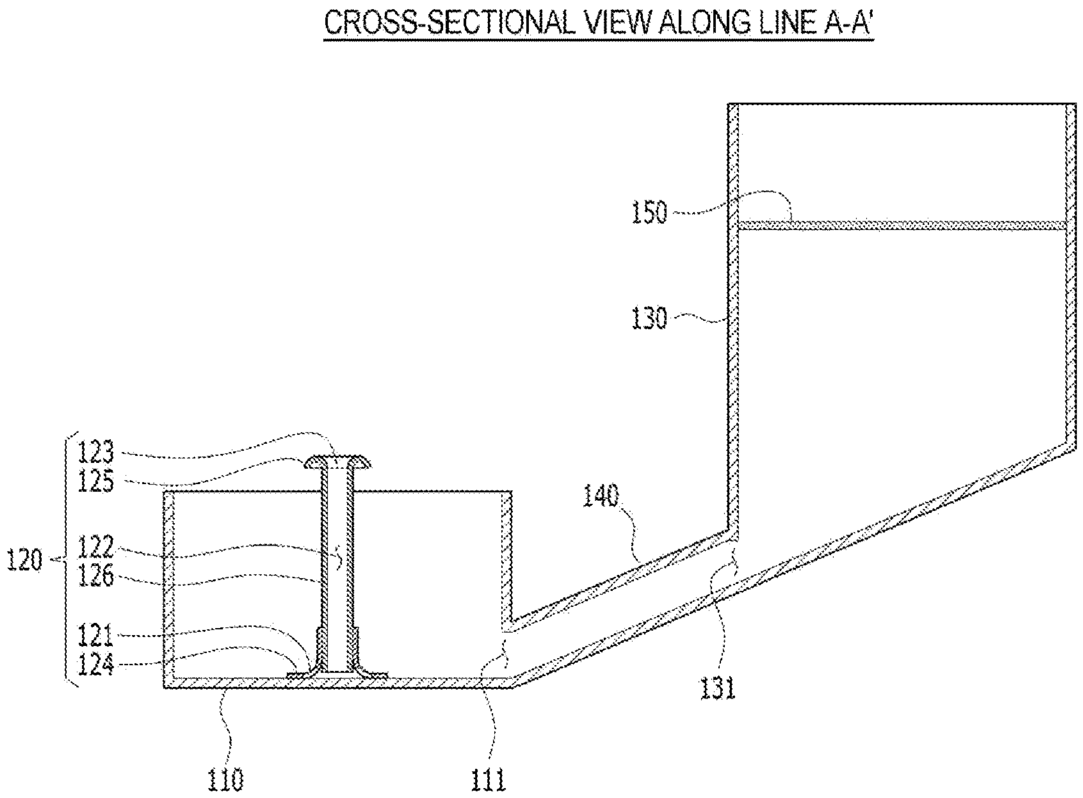
FIG. 4 is a cross-sectional view along line A-A' of FIG. 3.

FIG. 3 is a plan view of the candle illustrated in FIG. 2, and FIG. 4 is a cross-sectional view along line A-A' of FIG. 3.

Referring to these drawings, the combustion part 110 according to the present embodiment is a structure having a storage space of a predetermined volume formed therein, an open upper surface, and a fuel accommodation through-hole 111 formed in one side surface of a lower portion.

The wick support 120 according to the present embodiment is a columnar structure that is mounted to be attachable to and detachable from a bottom surface of a center of the storage space of the combustion part 110 and extends a predetermined height upward. Here, a through-hole 121 is formed in one side surface of a lower portion, and a flow tube 122, in which a fuel fed through the through-hole 121 is able to flow upward due to capillary action, is formed therein at a center of an inner portion to allow an upper surface and a lower surface to communicate with each other. Also, a wick insertion hole 123 is formed at a center of the upper surface to allow a candle wick 120*a* to be mounted and communicate with the flow tube 122.

Specifically, as illustrated in FIG. 4, the wick support 120 according to the present embodiment may be a component that includes a fixing leg 124 and a wick end support member 125 each having a specific structure. The fixing leg 124 of the wick support 120 is a component mounted to be attachable to and detachable from the bottom surface of the center of the storage space of the combustion part 110 and may radially extend about a central support 126 to fix the position of the central support 126. Also, the wick end support member 125 is a component that radially extends from a center of an upper surface of the central support 126 and forms a curved structure by being wound downward with a predetermined radius of curvature, and is a structure that supports a portion of a side surface of an upper portion of the candle wick 120*a* mounted in the wick insertion hole 123.

Also, the fixing leg 124 of the wick support 120 according to the present embodiment may be mounted to be attachable to and detachable from the central support 126. Here, the fixing leg 124 of the wick support 120 may include a height-changeable structure (not illustrated) that is able to change a height at which the central support 126 extends upward.

In this case, according to the present embodiment, since the fixing leg 124, the wick end support member 125, and the height-changeable structure each having a specific structure are included, the position of the candle wick 120*a* can be stably fixed, and thus it is possible to provide a candle that allows a fuel to be stably absorbed into the candle wick 120*a*, prevents the candle wick 120*a* itself from burning and shortening, and allows the height of the candle wick 120*a* to be easily changed according to a user's intention.

Meanwhile, the storage part 130 according to the present embodiment is a structure having a storage space of a predetermined volume formed therein, an open upper surface, and a fuel supply through-hole 131 formed in one side surface of a lower portion.

Here, as illustrated in FIGS. 2 to 4, the storage part 130 according to the present embodiment may be a component that further includes a fuel supply guide plate 150 having a specific structure.

Specifically, the fuel supply guide plate 150 may have a plate-shaped structure that comes in contact with an inner side surface of the storage space of the storage part 130 and covers the open upper surface thereof, may have a mesh-type structure in which a plurality of through-holes are formed, and may be made of a metal material that is heated by heat transferred to the storage part 130 and transfers heat to an upper surface of the fuel stored in the storage part 130.

In this case, according to the present embodiment, since the fuel supply guide plate 150 having a specific structure is included, thermal energy transferred to the storage part 130 can be received and effectively transferred also to the upper surface of the fuel stored in the storage part 130, and a phenomenon in which only a portion of a lower end of the fuel stored in the storage part 130 melts, causing an empty space to be formed, and a solid-phase fuel located at an upper portion of the empty space collapses inside the storage part 130 at an unspecified point in time can be prevented. Thus, it is possible to provide a candle that can ensure stable and continuous supply of the fuel stored in the storage part 130.

The fuel supply communication part 140 according to the present embodiment is a component that is mounted to allow communication between the fuel accommodation through-hole 111 of the combustion part 110 and the fuel supply through-hole 131 of the storage part 130.

The combustion part 110, the wick support 120, the storage part 130, and the fuel supply communication part 140 according to the present embodiment may be made of a metal material that absorbs heat generated due to a flame burning the fuel while fixed due to the wick support 120 and transfers the heat to the combustion part 110, the fuel supply communication part 140, and the fuel stored in the storage part 130.

Specifically, the metal material constituting the combustion part 110, the wick support 120, the storage part 130, and the fuel supply communication part 140 may be a material having thermal conductivity ranging from 100 W/mK to 450 W/mK. For example, the metal material constituting the combustion part 110, the wick support 120, the storage part 130, and the fuel supply communication part 140 may be an alloy material mixed with one or more materials selected from the group consisting of a silver material, a copper material, a gold material, a zinc material, an aluminum material, and a tungsten material or other metal materials.

In this case, according to the present embodiment, since the combustion part 110, the wick support 120, the storage part 130, and the fuel supply communication part 140 each made of a metal material having excellent thermal conductivity are included, thermal energy, which is generated in a process in which a fuel burns at an upper end of the wick support 120, can be effectively transferred to the fuel supply communication part 140 and the storage part 130 through the wick support 120 and the combustion part 110, and solidification of the fuel flowing through the inside of the fuel supply communication part 140 can be prevented using received thermal energy. Thus, it is possible to provide a candle that can ensure continuous supply of a fuel stored in the storage part 130.

As illustrated in FIG. 4, the bottom surface of the combustion part 110 according to the present embodiment may have a structure that comes in contact with and is parallel to the ground on which the candle 100 will be installed, and the fuel supply communication part 140 may be mounted to have a structure that is inclined upward at an angle ranging from 5° to 60° based on the fuel accommodation through-hole 111 of the combustion part 110. Also, a bottom surface of the storage part 130 may be an inclined surface that continues from the inclined structure of the fuel supply communication part 140.

In this case, according to the present embodiment, since a flow space ranging from the bottom surface of the combustion part 110 to the bottom surface of the storage part 130 via the fuel supply communication part 140 is formed to have an inclined structure, a fuel stored in the storage part 130 can naturally flow into the combustion part 110 through the fuel supply communication part 140 after melting due to thermal energy provided from the outside. Thus, it is possible to provide a candle that can ensure continuous supply of the fuel stored in the storage part 130.

According to circumstances, the fuel accommodation through-hole 111 of the combustion part 110 according to the present embodiment may have a structure that is able to be assembled to or disassembled from the fuel supply communication part 140, and the fuel supply through-hole 131 of the storage part 130 may have a structure that is able to be assembled to or disassembled from the fuel supply communication part 140. Also, the fuel supply communication part 140 may be bound to the fuel accommodation through-hole 111 and the fuel supply through-hole 131 by a structure that is able to change a slope in a vertical height direction.

Figure 5:
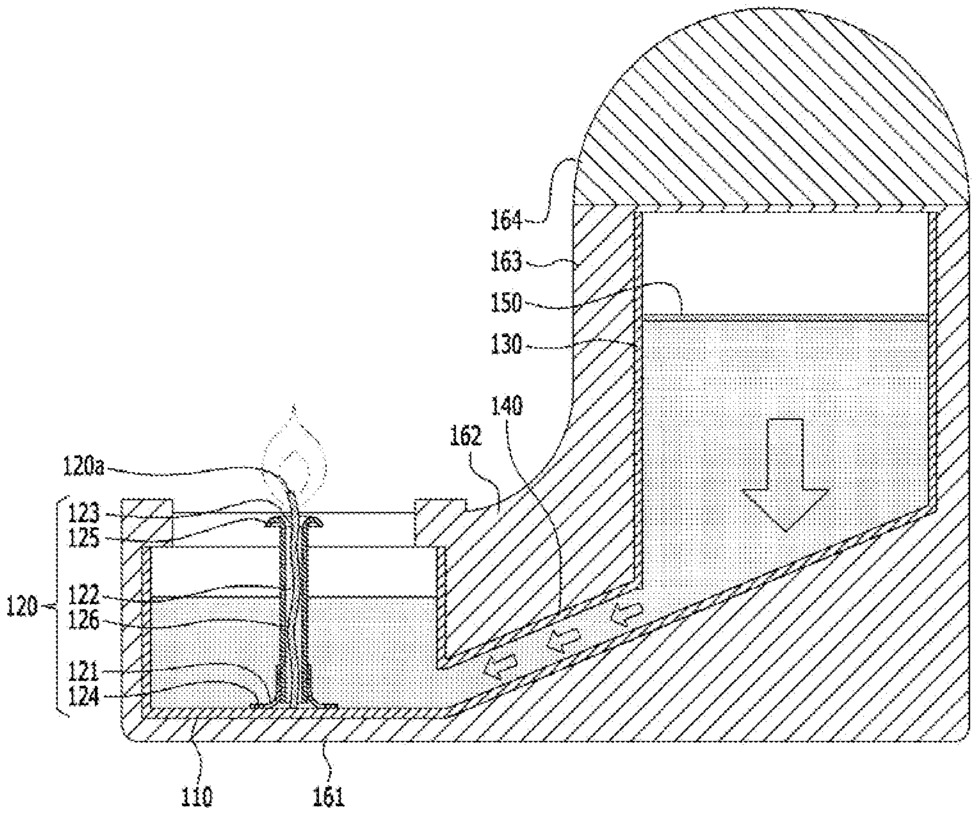
FIG. 5 is a longitudinal cross-sectional view illustrating a candle according to another embodiment of the present invention.

FIG. 5 is a longitudinal cross-sectional view illustrating a candle according to another embodiment of the present invention.

Referring to FIG. 5, a candle 100 according to the present embodiment may be a component that includes a combustion part housing 161, a communication part housing 162, and a storage part housing 163 each having a specific structure.

Specifically, the combustion part housing 161 is mounted to surround a side surface and a lower surface of the combustion part 110 while opening the upper surface of the combustion part 110 to the outside and is a structure which is filled with an insulating material or has an insulating structure formed therein. The communication part housing 162 is formed to surround an outer portion of the fuel supply communication part 140 and is a structure which is filled with an insulating material or has an insulating structure formed therein. Also, the storage part housing 163 is formed to surround an outer portion of the storage part 130, has a structure on which an opening/closing member 164 configured to open or close the upper surface of the storage part 130 to or from the outside is mounted, and is a structure which is filled with an insulating material or has an insulating structure formed therein.

In this case, according to the present embodiment, since the combustion part housing 161, the communication part housing 162, the storage part housing 163, and the opening/closing member 164 each having a specific structure are included, insulation can be performed to prevent thermal energy generated due to burning of a fuel in the combustion part 110 from being emitted to the outside, and the thermal energy generated in the combustion part 110 can be effectively transferred to the fuel supply communication part 140 and the storage part 130, and as a result, solidification of a fuel flowing through the inside of the fuel supply communication part 140 can be prevented using the received thermal energy. Thus, it is possible to provide a candle that can ensure continuous supply of a fuel stored in the storage part 130.

Also, according to circumstances, since various designs may be applied to outer shapes or outer surfaces of the combustion part housing, the communication part housing, the storage part housing, and the opening/closing member, various outer shapes and colors can be expressed according to an intention of a manufacturer or a user. Thus, it is possible to provide a candle of which the aesthetics can be enhanced by the manufacturer or user.

Figure 6:
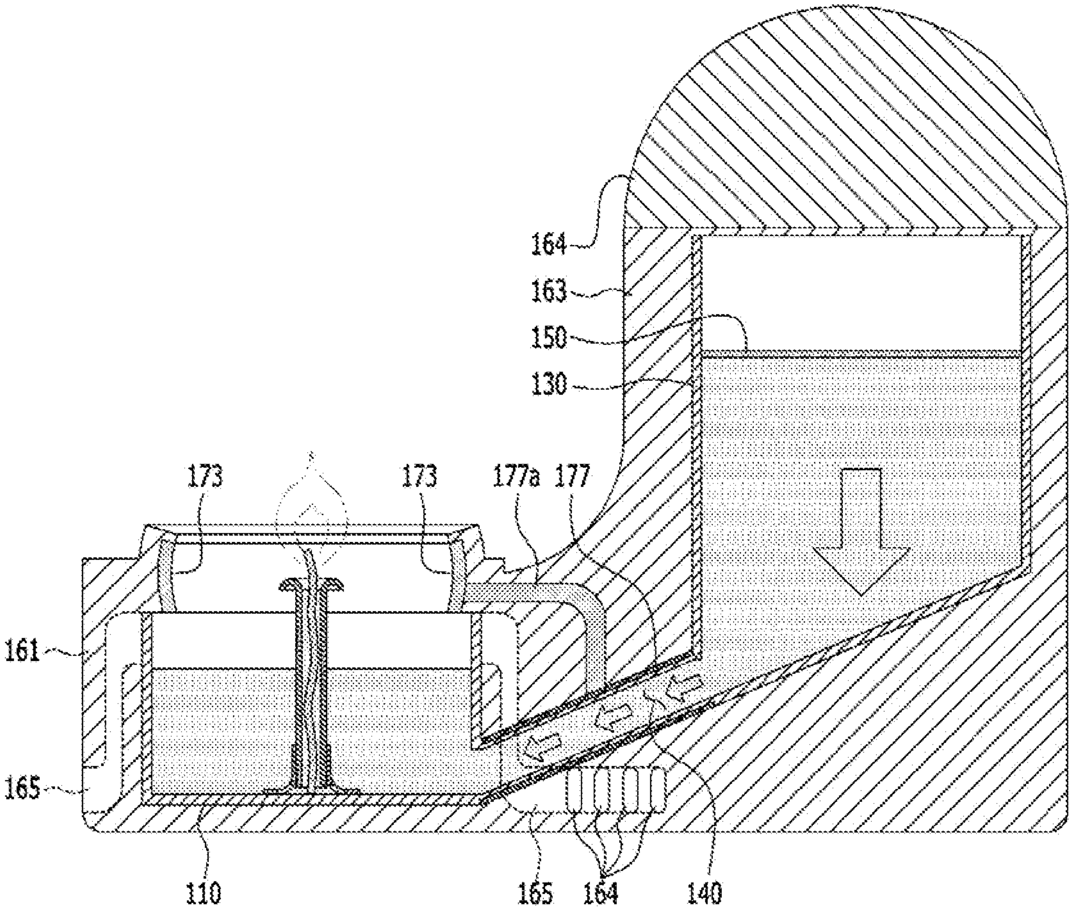
FIG. 6 is a longitudinal cross-sectional view illustrating a candle according to still another embodiment of the present invention.

FIG. 6 is a longitudinal cross-sectional view illustrating a candle according to still another embodiment of the present invention.

Referring to FIG. 6, the combustion part housing 161 according to the present embodiment may be a component that further includes an air intake 165 and an air intake amount adjustment member 166.

Specifically, the air intake 165 of the combustion part housing 161 is a component configured to communicate with the storage space of the combustion part 110 and is a structure configured to supply air from the outside to the inside of the storage space of the combustion part 110. Also, the air intake amount adjustment member 166 is a component mounted on a side surface of the combustion part housing 161 and is a structure configured to adjust a degree of opening of the air intake 165.

In this case, according to the present embodiment, since the air intake 165 and the air intake amount adjustment member 166 each having a specific structure are mounted in the combustion part housing 161, it is possible to provide a candle that allows an amount of fuel burning in the combustion part 110 and a light amount of a flame generated in the combustion part 110 to be adjusted according to a user's intention.

Figure 7:
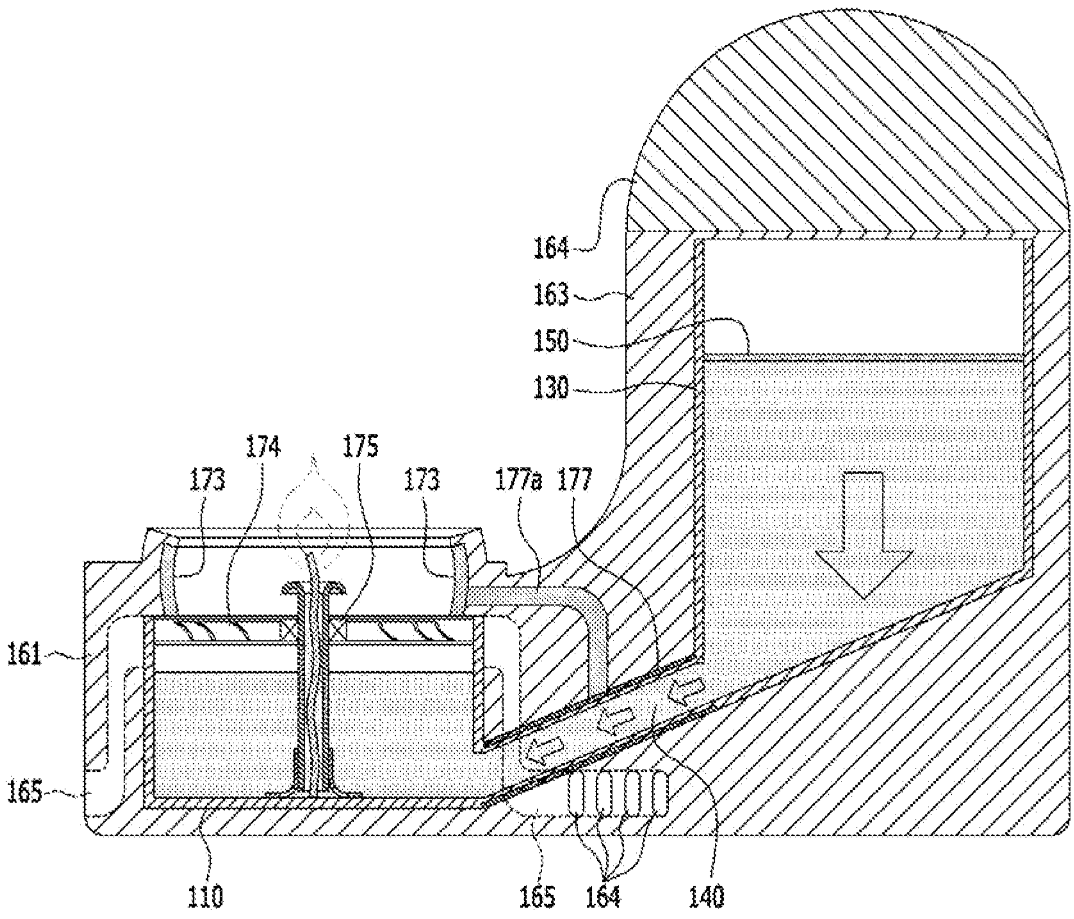
FIG. 7 is a longitudinal cross-sectional view illustrating a candle according to yet another embodiment of the present invention.
Figure 8:
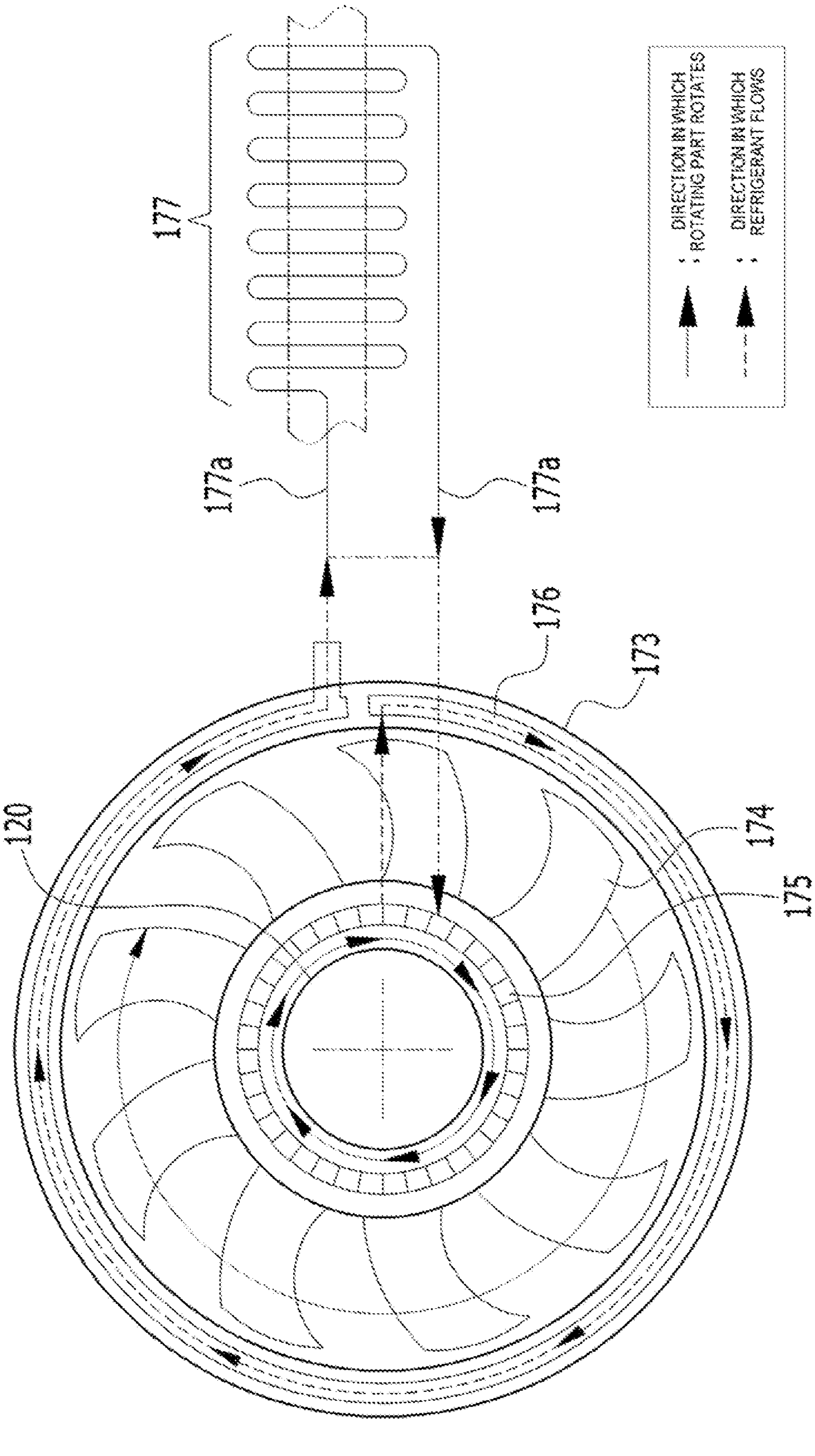
FIG. 8 is a plan view schematically illustrating a heat absorption part, a rotating part, a forced refrigerant circulation part, a heat absorption pipe part, and a heating pipe part of FIG. 7.

FIG. 7 is a longitudinal cross-sectional view illustrating a candle according to yet another embodiment of the present invention, and FIG. 8 is a plan view schematically illustrating a heat absorption part, a rotating part, a forced refrigerant circulation part, a heat absorption pipe part, and a heating pipe part of FIG. 7.

Referring to these drawings, a candle 100 according to the present embodiment may be a component that includes a heat absorption part 173, a rotating part 174, a forced refrigerant circulation part 175, a heat absorption pipe part 176, and a heating pipe part 177 each having a specific structure.

Specifically, the heat absorption part 173 according to the present embodiment is a component which is mounted on an upper portion of the storage space of the combustion part 110 and mounted on an inner side surface of the open upper surface of the combustion part 110 and may have a curved structure having a center of a radius of curvature disposed at a center of an upper surface of the wick support 120 and absorb thermal energy generated due to a flame that burns at the upper surface of the wick support 120.

The rotating part 174 according to the present embodiment is a component which is mounted to surround an outer circumferential surface of the upper portion of the wick support 120, has a structure having an outer diameter equal to an inner diameter of the open upper surface of the combustion part 110, and may rotate due to air that is fed from the air intake 165 and flows through the open upper surface of the combustion part 110. Here, the forced refrigerant circulation part 175 is a pipe structure mounted to surround the outer circumferential surface of the upper portion of the wick support 120 and may cause a refrigerant flowing therein to flow in one direction due to the rotation of the rotating part 174 and cause a refrigerant received from the heating pipe part 177 to flow to the heat absorption pipe part 176.

The heat absorption pipe part 176 according to the present embodiment is a component which is mounted in the heat absorption part 173 and may extend in a direction identical to a direction in which the heat absorption part 173 extends, transfer thermal energy absorbed from the heat absorption part 173 to a refrigerant flowing therein, and cause the refrigerant received from the forced refrigerant circulation part 175 to flow to the heating pipe part 177. Also, the heating pipe part 177 is a component which is mounted to surround an outer circumferential surface of the fuel supply communication part 140, is a pipe structure configured to cause a heated refrigerant received from the heating pipe part 177 to flow, and may transfer thermal energy of the heated refrigerant to the fuel supply communication part 140 and cause the refrigerant received from the heat absorption pipe part 176 to flow to the heat absorption pipe part 176.

In this case, according to the present embodiment, since the heat absorption part 173, the rotating part 174, the forced refrigerant circulation part 175, the heat absorption pipe part 176, and the heating pipe part 177 each having a specific structure are included, thermal energy generated in the combustion part 110 can be absorbed, and the absorbed thermal energy can be transferred to the outer circumferential surface of the fuel supply communication part 140, and as a result, solidification of a fuel flowing through the inside of the fuel supply communication part 140 can be prevented using the received thermal energy. Thus, it is possible to provide a candle that can ensure continuous supply of a fuel stored in the storage part 130.

Figure 9:
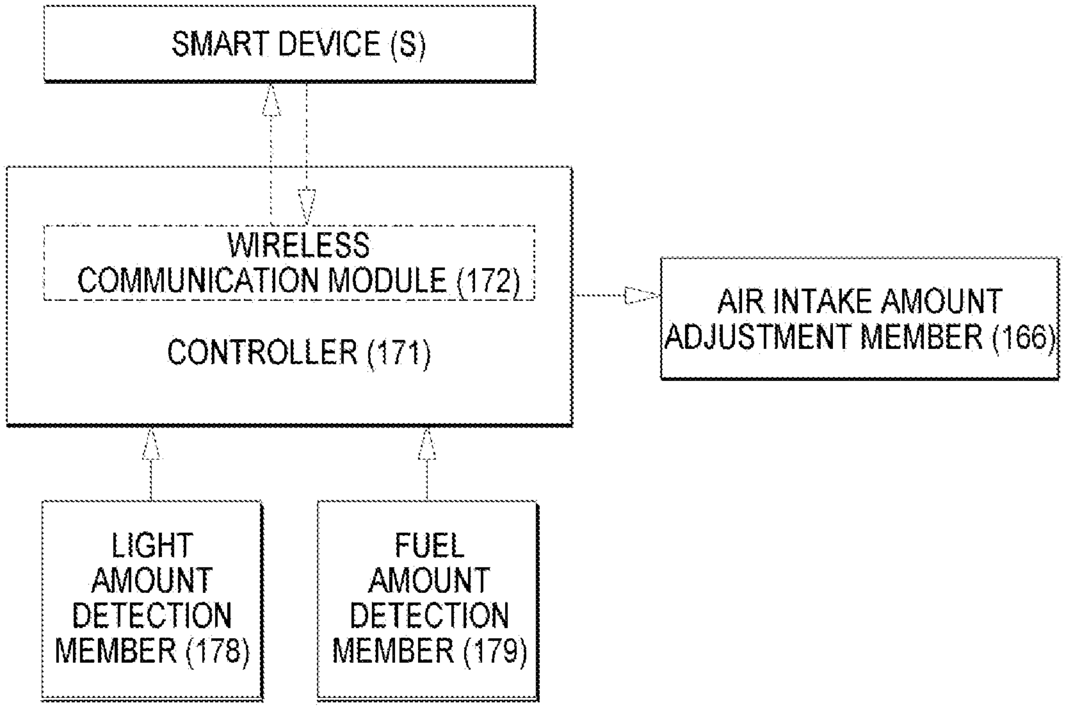
FIG. 9 is a control block diagram of a candle according to yet another embodiment of the present invention.

FIG. 9 is a control block diagram of a candle according to yet another embodiment of the present invention.

Referring to FIG. 9, a candle 100 according to the present embodiment may be a component that includes a controller 171, a wireless communication module 172, a light amount detection member 178, and a fuel amount detection member 179.

Specifically, the controller 171 according to the present embodiment is a component mounted in the storage part housing 163 and may control an operation of the air intake amount adjustment member 166 based on data received from the light amount detection member 178 and data input from a smart device of a user and deliver information relating to an operational state of the candle to the smart device of the user through the wireless communication module 172 based on data detected from the fuel amount detection member. Here, the wireless communication module 172 is a component mounted in the controller 171 and may wirelessly interoperate with the smart device of the user, receive a control signal from the smart device of the user, transmit the control signal to the controller 171, and transfer data generated from the controller 171 to the smart device of the user.

The light amount detection member 178 according to the present embodiment is a component mounted in the combustion part housing 161 and may detect a light amount of a flame burning in the combustion part 110 in real time and then transfer detected data to the controller 171.

Also, the fuel amount detection member 179 is a component mounted in the storage part housing 163 and may detect an amount of fuel stored in the storage part 130 in real time and then transfer detected data to the controller 171.

In this case, according to the present embodiment, since the controller 171, the wireless communication module 172, the light amount detection member 178, and the fuel amount detection member 179 each performing a specific role are included, an amount of fuel burning in the combustion part 110 can be easily adjusted according to a user's intention, a light amount of a flame generated due to burning in the combustion part 110 can be easily adjusted, and the amount of fuel stored in the storage part 130 can be checked in real time. Thus, it is possible to provide a candle that allows a time to refill the fuel to be conveniently checked.

According to circumstances, an aromatic may be mounted on an upper portion of the storage part 130 to improve a scent producing effect. Specifically, an aromatic may be mounted on an upper surface of the fuel supply guide plate 150 disposed in the storage part 130. Examples of the aromatic that may be mounted include a scented plaster, a scented gel, and the like.

Here, the scent producing effect of the aromatic disposed at the upper portion of the storage part 130 may be improved by thermal energy transferred to the storage part 130.

Also, when the storage part housing 163 is applied, a plurality of through-holes may be formed in the opening/closing member 164 for a scent to spread to the outside.

Some particular embodiments of the present invention have been described above in the above detailed description of the present invention. However, the present invention should not be understood as being limited to the particular embodiments mentioned in the detailed description and should rather be understood as including all modifications, equivalents, and substitutes within the spirit and scope of the present invention defined by the appended claims.

That is, the present invention is not limited to the specific embodiments described above, those of ordinary skill in the art to which the present invention pertains may make various modifications without departing from the gist of the present invention claimed in the claims, and such modifications also belong to the protection scope of the present invention.

Modes of the Invention

The modes of the invention have been described above in describing the best mode of the invention.

INDUSTRIAL APPLICABILITY

The present invention relates to a candle including a fuel supply part and can provide a candle including a fuel supply part that can continuously supply a fuel to a combustion space, enhance aesthetics, and improve a scent producing effect. Thus, the present invention has industrial applicability.

The invention claimed is:

1. A candle comprising:

a combustion part (110) having a storage space of a predetermined volume formed therein and an open upper surface and having a fuel accommodation through-hole (111) formed in one side surface of a lower portion;

a wick support (120) having a columnar structure that is mounted to be attachable to and detachable from a bottom surface of a center of the storage space of the combustion part (110) and extends a predetermined height upward, having a through-hole (121) formed in one side surface of a lower portion, having a flow tube (122), in which a fuel fed through the through-hole (121) is able to flow upward due to capillary action, formed therein at a center of an inner portion to allow an upper surface and a lower surface to communicate with each other, and having a wick insertion hole (123) formed at a center of the upper surface to allow a candle wick (120*a*) to be mounted and communicate with the flow tube (122);

a storage part (130) having a storage space of a predetermined volume formed therein and an open upper surface and having a fuel supply through-hole (131) formed in one side surface of a lower portion;

a fuel supply communication part (140) mounted to allow communication between the fuel accommodation through-hole (111) of the combustion part (110) and the fuel supply through-hole (131) of the storage part (130); and a fuel supply guide plate (150) having a plate-shaped structure that comes in contact with an inner side surface of the storage space of the storage part (130) and covers the open upper surface thereof, having a mesh-type structure in which a plurality of through-holes are formed, and made of a metal material that is heated by heat transferred to the storage part (130) and transfers heat to an upper surface of the fuel stored in the storage part (130), wherein the combustion part (110), the wick support (120), the storage part (130), the fuel supply communication part (140), and the fuel supply guide plate (150) are made of a metal material that absorbs heat generated due to a flame burning the fuel while fixed due to the wick support (120) and transfers the heat to the combustion part (110), the fuel supply communication part (140), and the fuel stored in the storage part (130), and wherein the bottom surface of the combustion part (110) has a structure that comes in contact with and is parallel to a ground on which the candle will be installed;

the fuel supply communication part (140) is mounted to have a structure that is inclined upward at an angle ranging from 5° to 60° based on the fuel accommodation through-hole (111) of the combustion part (110); and a bottom surface of the storage part (130) is an inclined surface that continues from the inclined structure of the fuel supply communication part (140).

2. The candle of claim 1, further comprising:

a combustion part housing (161) which is mounted to surround a side surface and a lower surface of the combustion part (110) while opening the upper surface of the combustion part (110) to the outside and which is filled with an insulating material or has an insulating structure formed therein;

a communication part housing (162) which is formed to surround an outer portion of the fuel supply communication part (140) and which is filled with an insulating material or has an insulating structure formed therein; and a storage part housing (163) which is formed to surround an outer portion of the storage part (130), has a structure on which an opening/closing member (164) configured to open or close the upper surface of the storage part (130) to or from the outside is mounted, and which is filled with an insulating material or has an insulating structure formed therein, wherein the combustion part housing (161) includes an air intake (165) configured to communicate with the storage space of the combustion part (110) and supply air from the outside to the inside of the storage space of the combustion part (110) and an air intake amount adjustment member (166) mounted on a side surface of the combustion part housing (161) and configured to adjust a degree of opening of the air intake (165).

3. The candle of claim 2, wherein the combustion part housing (161) includes:

a heat absorption part (173) which is mounted on an upper portion of the storage space of the combustion part (110), mounted on an inner side surface of the open upper surface of the combustion part (110), has a curved structure having a center of a radius of curvature disposed at a center of an upper surface of the wick support (120), and is configured to absorb thermal energy generated due to a flame that burns at the upper surface of the wick support (120);

a rotating part (174) which is mounted to surround an outer circumferential surface of an upper portion of the wick support (120), has a structure having an outer diameter equal to an inner diameter of the open upper surface of the combustion part (110), and is configured to rotate due to air that is fed from the air intake (165) and flows through the open upper surface of the combustion part (110);

a forced refrigerant circulation part (175) which has a pipe structure mounted to surround the outer circumferential surface of the upper portion of the wick support (120) and is configured to cause a refrigerant flowing therein to flow in one direction due to the rotation of the rotating part (174) and cause a refrigerant received from a heating pipe part (177) to flow to a heat absorption pipe part (176);

the heat absorption pipe part (176) which is mounted in the heat absorption part (173), extends in a direction identical to a direction in which the heat absorption part (173) extends, and is configured to transfer thermal energy absorbed from the heat absorption part (173) to a refrigerant flowing therein and cause the refrigerant received from the forced refrigerant circulation part (175) to flow to the heating pipe part (177); and the heating pipe part (177) which is mounted to surround an outer circumferential surface of the fuel supply communication part (140), has a pipe structure configured to cause a heated refrigerant received from the heating pipe part (177) to flow, and is configured to transfer thermal energy of the heated refrigerant to the fuel supply communication part (140) and cause the refrigerant received from the heat absorption pipe part (176) to flow to the heat absorption pipe part (176).

4. The candle of claim 3, further comprising:

a controller (171) mounted in the storage part housing (163) and configured to control an operation of the air intake amount adjustment member (166) based on data received from a light amount detection member (178) and data input from a smart device of a user and deliver information relating to an operational state of the candle to the smart device of the user through a wireless communication module (172) based on data detected from a fuel amount detection member (179);

the wireless communication module (172) mounted in the controller (171) and configured to wirelessly interoperate with the smart device of the user, receive a control signal from the smart device of the user, transmit the control signal to the controller (171), and transfer data generated from the controller (171) to the smart device of the user;

the light amount detection member (178) mounted in the combustion part housing (161) and configured to detect a light amount of a flame burning in the combustion part (110) in real time and then transfer detected data to the controller (171); and the fuel amount detection member (179) mounted in the storage part housing (163) and configured to detect an amount of fuel stored in the storage part (130) in real time and then transfer detected data to the controller (171).

5. The candle of claim 1 further comprising:

a rotating part (174) mounted to surround the wick support (120), configured to rotate due to air from an air intake (165).

* * * * *